(12) United States Patent
Langiny et al.

(10) Patent No.: US 10,569,500 B2
(45) Date of Patent: Feb. 25, 2020

(54) METHOD FOR PRODUCING AN AUTOMOTIVE EQUIPMENT PART AND ASSOCIATED PART

(71) Applicant: FAURECIA AUTOMOTIVE INDUSTRIE, Nanterre (FR)

(72) Inventors: Michel Langiny, Pouru St Remy (FR); Valérie Marcel, Brandeville (FR); Ludovic Jean Raymond Dejaeger, Douzy (FR); Arnaud Duval, Charleville-Mezieres (FR)

(73) Assignee: FAURECIA AUTOMOTIVE INDUSTRIE, Nanterre (FR)

( * ) Notice: Subject to any disclaimer, the term of this patent is extended or adjusted under 35 U.S.C. 154(b) by 228 days.

(21) Appl. No.: 15/501,846

(22) PCT Filed: Aug. 6, 2015

(86) PCT No.: PCT/EP2015/068214
§ 371 (c)(1),
(2) Date: Feb. 5, 2017

(87) PCT Pub. No.: WO2016/020505
PCT Pub. Date: Feb. 11, 2016

(65) Prior Publication Data
US 2017/0225430 A1     Aug. 10, 2017

(30) Foreign Application Priority Data

Aug. 6, 2014 (FR) .................................... 14 57655

(51) Int. Cl.
*B32B 5/18* (2006.01)
*B32B 3/26* (2006.01)
(Continued)

(52) U.S. Cl.
CPC .................. *B32B 5/18* (2013.01); *B32B 3/26* (2013.01); *B32B 15/08* (2013.01); *B60R 13/08* (2013.01); *F02B 77/11* (2013.01)

(58) Field of Classification Search
CPC ....... B29C 44/10; B29C 44/105; B29C 44/12; B29C 44/1204; B29C 44/1209;
(Continued)

(56) References Cited

U.S. PATENT DOCUMENTS 4,105,594 A * 8/1978 Dieterich ............... C08J 9/0066
521/100
5,840,225 A    11/1998 Kikuchi et al.
(Continued)

FOREIGN PATENT DOCUMENTS

EP    1584440 A2    10/2005
EP    2170576 A2    4/2010
(Continued)

OTHER PUBLICATIONS

Duval, Arnaud. "Faurecia Acoustic Light-Weight Concept", abstract only, (2002), 1 page.
(Continued)

*Primary Examiner* — Stella K Yi
(74) *Attorney, Agent, or Firm* — Reising Ethington P.C.

(57) ABSTRACT

A method for producing an automotive equipment part includes the following steps: arranging a porous layer in a foaming mold; injection, on one side of the porous layer, of a foam precursor; expansion of the precursor material to form a foam base layer bonded to the porous layer; and extraction from the mold of the equipment part including the porous layer and the foam base layer bonded to the porous layer. The method further includes a step for injecting a
(Continued)

pressurized fluid on a second side of the porous layer to form a counter-pressure to the expansion of the precursor material.

12 Claims, 5 Drawing Sheets

(51) Int. Cl.
*B32B 15/08* (2006.01)
*B60R 13/08* (2006.01)
*F02B 77/11* (2006.01)

(58) Field of Classification Search
CPC ............ B29C 44/1214; B29C 44/1219; B29C 44/1233; B29C 44/1261; B29C 44/1276; B29C 44/14; B29C 44/148; B29C 44/16; B29C 44/1285
See application file for complete search history.

(56) References Cited

U.S. PATENT DOCUMENTS

| | | | |
|---|---|---|---|
| 6,136,415 A * | 10/2000 | Spengler | B29C 44/569 264/46.6 |
| 6,200,505 B1 | 3/2001 | Zibert | |
| 7,201,253 B2 | 4/2007 | Duval et al. | |
| 8,157,051 B2 | 4/2012 | Marcel et al. | |
| 9,133,615 B2 | 9/2015 | Bischoff et al. | |

FOREIGN PATENT DOCUMENTS

| | | |
|---|---|---|
| FR | 2165776 A1 | 8/1973 |
| FR | 2979308 A1 | 3/2013 |
| GB | 2221184 A | 1/1990 |
| WO | WO0126932 A1 | 4/2001 |
| WO | WO03069596 A1 | 8/2003 |
| WO | WO2009016321 A2 | 2/2009 |

OTHER PUBLICATIONS

International Search Report in French for International application No. PCT/EP2015/068214, dated Oct. 19, 2015, 3 pages.

* cited by examiner

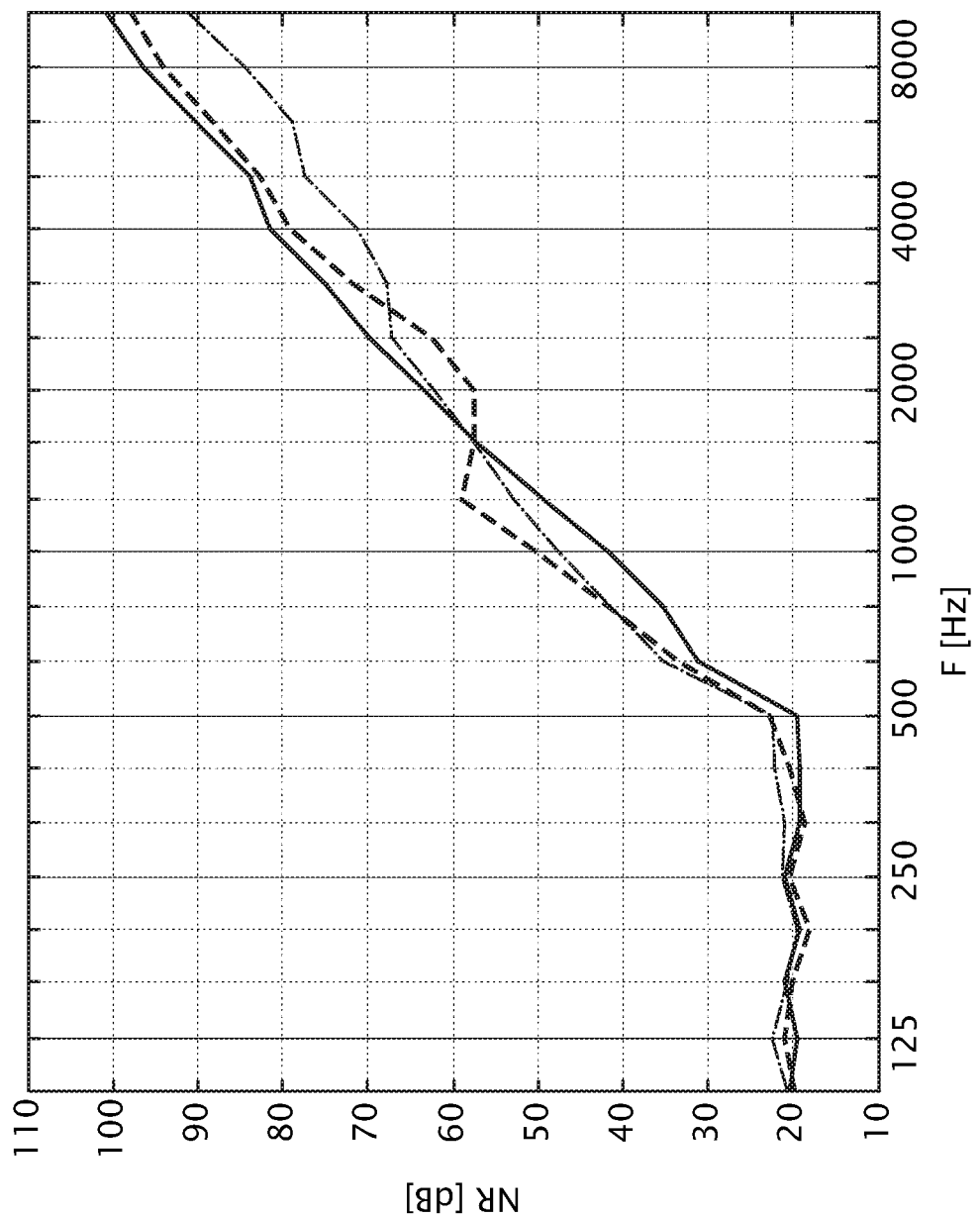

METHOD FOR PRODUCING AN AUTOMOTIVE EQUIPMENT PART AND ASSOCIATED PART

TECHNICAL FIELD

The present invention relates to a method for manufacturing an equipment part of an automotive vehicle, comprising:
- arranging a porous layer in a foaming mold;
- injection, on one side of the porous layer, of a foam precursor;
- expansion of the precursor material to form a foam base layer bonded to the porous layer;
- extraction from the mold of an equipment part including the porous layer and the foam base layer bonded to the porous layer.

BACKGROUND

Such a part is in particular able to form an automotive sound-proofing assembly. Such an assembly is intended to resolve the acoustic problems that arise in a substantially closed space, such as the passenger compartment of a motor vehicle (mat, roof, door panel, etc.), near noise sources such as an engine (fire wall, etc.), pneumatic contact with a road (wheel passage, etc.), etc.

In general, in the low frequency domain, the acoustic waves created by the aforementioned noise sources undergo a "damping" by materials in the form of single or double sheets (pre-stressed sandwich) having a viscoelastic behavior or by acoustic attenuation of a porous and elastic mass-spring system.

Within the meaning of the present invention, a soundproofing assembly provides "insulation" when it prevents the entry of medium and high frequency acoustic waves into the soundproofed space, essentially by reflecting waves toward the noise sources or the outside of the soundproofed space.

A soundproofing assembly operates by "sound absorption" (in the medium and high frequency field) when the energy from the acoustic waves dissipates in an absorptive material.

A high-performance soundproofing assembly must work both by providing good insulation and absorption. To characterize the performance of such an assembly, the notion of noise reduction (NR) index is used, which takes into account the notions of insulation and absorption: this index can because related using the following equation:

$$NR(dB) = TL - 10\log(S/A)$$

Where TL is the sound transmission loss index (hereinafter referred to as the loss index) reflecting the insulation. The higher this index is, the better the insulation is.

A is the equivalent absorption surface. The higher A is, the better the absorption is.

To produce good soundproofing, for example for a motor vehicle passenger compartment, it is desirable to implement a set of materials that will make it possible to use these two concepts wisely. This has been described in many articles, in particular in the article "Faurecia Acoustic Light-weight Concept" by A Duval from 2002 during the 2002 SIA/CTTM conference in Le Mans.

In particular, it is desirable to obtain light assemblies, recyclable if possible, having a sufficient absorption and retaining a high insulation performance level. To that end, WO03/069596 describes that complexes comprising a foam base layer, a tight layer (also called heavy mass) with a low surface density, and a porous layer, have been developed.

These complexes provide an excellent compromise between absorption and insulation, while retaining appropriate lightness.

To improve the recyclability, EP 2,170,576 describes an acoustic complex including a foam base layer, a porous upper layer, and a tight intermediate layer formed by penetration of the precursor material of the foam base layer in the porous layer.

In the method described in this patent, it is difficult to control the thickness, and therefore the mass, of the tight intermediate layer, which often leads to an overuse of raw materials and therefore an excess cost. Indeed, the composition of this layer depends on the porosity of the upper layer (which is adapted based on the application), which will allow more or less of the precursor material to penetrate.

Likewise, FR 2,979,308 describes an acoustic complex including a foam base layer, a tight intermediate layer, and a porous so-called stiffening foam layer because of its stiffness in bend. The choice of a high stiffness in bend for the stiffening layer provides optimized acoustic properties in terms of insulation.

The manufacture of these complexes includes arranging at least one porous layer in a foaming mold, then introducing a precursor material of the foam base layer, which expands.

However, in some cases, the manufacture of the aforementioned complexes may prove complicated. Indeed, the expansion of the precursor material causes a compression of the porous layer.

In some cases, in particular when the porous layer is particularly stiff in bend, it may be crushed abruptly under the effect of the pressure from the foaming material. This phenomenon causes a sudden increase in the volume in which the precursor material may foam, causing the foam of the base layer in formation to collapse.

This phenomenon is comparable to what one skilled in the art knows as "collapse". Indeed, the sudden increase in volume occurs while the foam is in formation, at a moment when the walls of the cells are not yet cross-linked, and are therefore not very strong. The rapid increase in volume causes an expansion of the gases, which causes the destruction of the walls. The skeleton of the foam collapses and then forms a sort of skin.

The complex then has deteriorated mechanical and acoustic properties.

Another drawback of these methods lies in the fact that the cells of the base layer can remain partially closed, limiting the porosity, and therefore the acoustic performance, of the base foam. This closing of the cells also causes volatile organic compounds (VOCs) from the foaming reaction to be trapped, which will nevertheless be able to be gradually discharged by migration during the use of the product.

SUMMARY

One aim of the invention is therefore to obtain a method for manufacturing an automotive equipment part comprising a rigid porous layer and a foam base layer having highly satisfactory mechanical and acoustic properties.

Another aim of the invention is to produce acoustic complexes of the type described above, but having a tight interface with a low surface density, independent of the porosity of the upper layer.

Another aim of the invention is to allow the production of foams with cells in the base layer that are as open as possible, thereby optimizing the acoustic performance of the complex and minimizing the emission of VOCs over time.

To that end, the invention relates to a method of the aforementioned type, characterized in that it comprises a step for injecting a pressurized fluid on a second side of the porous layer to form a counter-pressure to the expansion of the precursor material.

According to specific embodiments, the process according to the invention comprises one or more of the following features, considered alone or according to any technically possible combination(s):

the pressurized fluid is a gas.
the pressurized fluid is injected after the precursor material is injected.
the pressurized fluid is injected after the precursor material comes into contact with the porous layer during the expansion of the precursor material.
the foaming mold comprises a first mold surface, the step for arranging the first porous layer in the foaming mold including arranging the second side of the porous layer across from the first mold surface.
the pressurized fluid is injected through a plurality of orifices emerging in the first mold surface.
the density of orifices emerging in the first mold surface is comprised between 1 orifice per square meter and 8 orifices per square meter.
the method comprises a step for applying a vacuum on a second side of the porous layer after the foam base layer is formed.
the porous layer is chosen from among an expanded foam layer, a felt layer, a slit foam layer.
the porous layer is a layer of expanded foam, the method including an initial step for forming the porous layer from a precursor material including the same components as the precursor material of the foam base layer.
the foam base layer and the porous layer are made with a base of a precursor mixture of a same polyol, a same isocyanate, and water.
the foam base layer and the porous layer are made with a base of a precursor mixture of a same polyol, a same isocyanate, the expanded foam layer including fillers, in particular chalk, barite or mixtures thereof.
the precursor material of the foam base layer does not penetrate the porous layer and forms a tight intermediate layer at the interface between the porous layer and the foam base layer.
the porous layer bears at least one tight layer, the tight layer being situated on the first side of the porous layer after the porous layer is arranged in the foaming mold.
the equipment part extracted in the extraction step is an automotive vehicle soundproofing assembly.
the stiffness in bend of the porous layer is greater than the stiffness in bend of the foam base layer after expansion.

The invention also relates to an automotive equipment part, comprising:

a porous layer;
a foam base layer;
an airtight intermediate layer arranged between the porous layer and the foam base layer,
characterized in that the tight intermediate layer is formed in a single piece with the foam base layer,
at least part, advantageously all, of the tight intermediate layer being arranged outside the porous layer while being made from the same material as that forming the foam base layer.

BRIEF DESCRIPTION OF THE DRAWINGS

The invention will be better understood upon reading the following description, provided solely as an example, and in reference to the appended drawings, in which:

FIG. 8 shows the Noise Reduction (NR) Index curves for two parts according to the invention in comparison with a part according to WO03/069596, constituting the state of the art.

DETAILED DESCRIPTION

In the rest of this document, the orientations are generally the typical orientations of a motor vehicle, However, the terms "above", "on", "below", "under", "upper" and "lower" are to be understood as relative terms, with respect to the reference surface of the motor vehicle, in light of which the soundproofing assembly is arranged. The term "lower" is thus understood as being situated as close as possible to the surface, and the term "upper" as being situated as far as possible from this surface.

Figure 1:
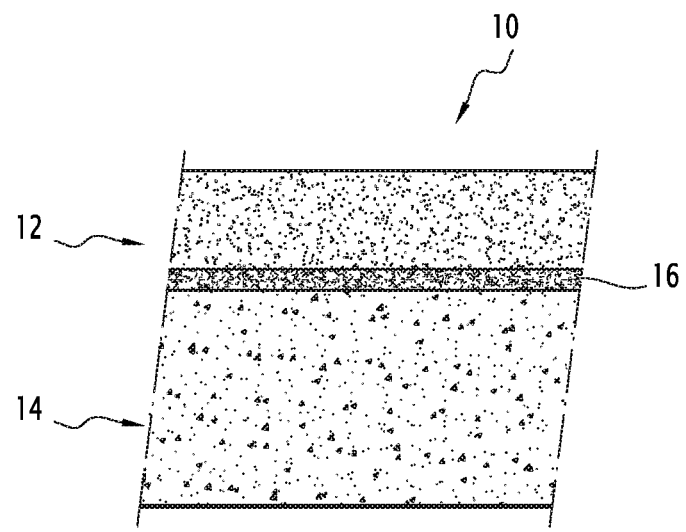
FIG. 1 is a schematic sectional view of a first equipment part of a motor vehicle produced using a method according to the invention.

A first automotive equipment part 10, produced using a method according to the invention, is illustrated by FIG. 1.

The part 10 is for example intended to form a soundproofing assembly able to be arranged across from a surface of a motor vehicle.

The surface is for example a sheet metal surface of the vehicle in particular defining an automotive floor, ceiling, door, fire wall separating the passenger compartment from the engine compartment, hood, or wheel well.

In reference to FIG. 1, the part 10 includes at least a porous layer 12 and a foam base layer 14 bonded to the porous layer 12.

In this example, the part 10 further includes an intermediate layer 16 situated between the porous layer 12 and the foam base layer 14.

The porous layer 12 is advantageously a stiffening layer. It has a stiffness in bend B, brought to a unitary width, for example greater than 0.01 N.m, in particular comprised between 0.1 N.m and 10.0 N.m. The stiffness in bend B is for example greater than 0.4 N.m, in particular greater than 3.0 N.m.

The stiffness in bend B is computed using the equation:

$$B = E \cdot h^3 / 12,$$

where h is the thickness of the layer 12, and E is its Young's modulus.

Its Young's modulus nevertheless remains greater than $10^5$ Pa, in particular in the case of significant thicknesses exceeding 15 mm (limit value for flexural modulus).

The Young's modulus or modulus of elasticity is for example measured using the method described in standard NF EN ISO 527-3 (static measurement), or advantageously according to standard ISO-18437-5 (dynamic method).

The porous layer 12 is for example made by expansion of a foam to form an open porous expanded foam layer. Alternatively, the porous layer 12 is a slit open foam layer or a felt. The open foam layer may be made from waste in the form of agglomerated and adhered foam flakes. The felt layer may also contain different types of recycled materials.

When the porous layer 12 is made by the expansion of a foam, the foam fits the shape of the mold with thicknesses that are often variable while keeping the same density everywhere, unlike what happens with a slit foam or a felt, which will be more compressed in the thinner locations. For this reason, expanded foam is often preferred to produce the layer 12.

The thickness of the porous layer 12 is for example comprised between 1 mm and 25 mm, and is in particular comprised between 5 mm and 10 mm.

The porosity of the layer 12 is chosen so that the resistance to air flow by this layer 12 is greater than 300 $N.m^{-3}.s$ and is advantageously comprised between 300 $N.m^{-3}.s$ and 6000 $N.m^{-3}.s$, in particular comprised between 2000 $N.m^{-3}.s$ and 5000 $N.m^{-3}.s$.

The resistance to air flow or its resistivity is measured using the method described in the thesis "Measurement of parameters characterizing a porous medium. Experimental study of the acoustic behavior of low-frequency foams.", Michel HENRY, defended Oct. 3, 1997 University of Mans.

The porous layer 12 is for example formed with a base of polyurethane, from a precursor mixture of a polyol and an isocyanate. The weight ratio between the polyol and the isocyanate is for example comprised between 100:50 and 100:80.

The density of the porous layer is advantageously comprised between 10 $kg/m^3$ and 150 $kg/m^3$, preferably between 90 $kg/m^3$ and 100 $kg/m^3$. One skilled in the art knows how to adapt the formulation to obtain the desired density without affecting the other parameters of the foam. In particular, the porous layer 12 may contain fillers, for example chalk and/or barium sulfate. This increases the density of the layer 12, and therefore its insulating properties.

This foam may have a high tortuosity, in particular greater than 1.4 and advantageously comprised between 1.4 and 3, as described in application WO-2007/006950 by the Applicant. This tortuosity is measured by determining the slope of the curve representing the variation of the square of the refraction index for the acoustic wavelength used, based on the inverse of the square root of the frequency.

Figure 2:
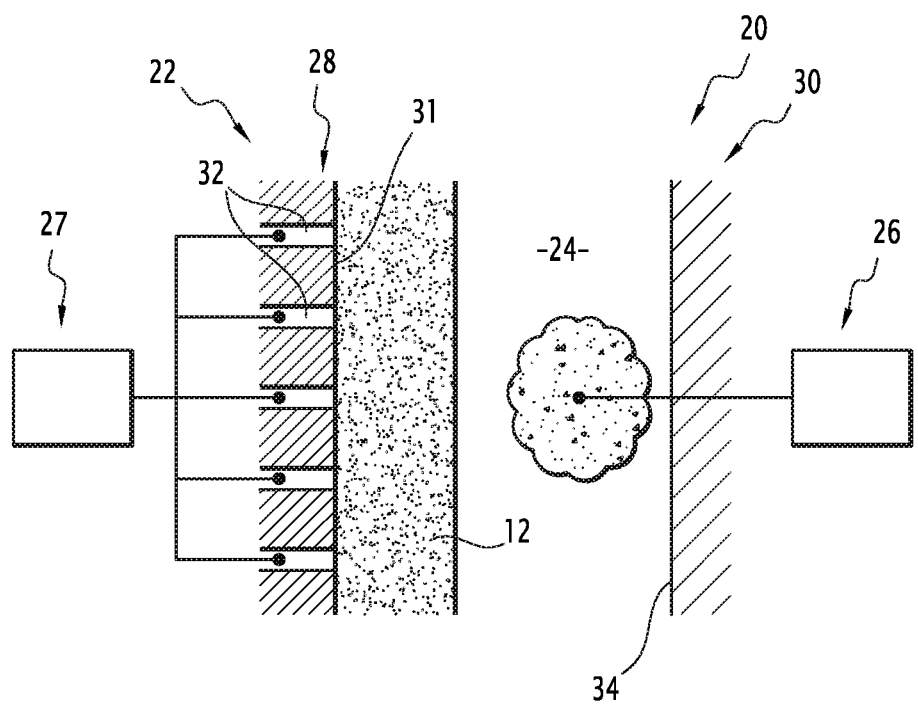
FIGS. 2 to 4 are views of successive steps of the manufacturing method according to the invention.

The foam base layer 14 is obtained using the method according to the invention by the expansion of a precursor material in a foaming mold 20 illustrated by FIG. 2.

Advantageously, the precursor material is similar, or even identical, to that used to form the porous layer 12.

The stiffness in bend B of the foam base layer 14 is lower than that of the porous layer 12.

The foam base layer 14 advantageously has a porosity suitable for having an air flow resistance advantageously comprised between 10,000 $N.m^{-4}.s$ and 90,000 $N.m^{-4}.s$, in particular equal to about 30,000 $N.m^{-4}.s$.

The density of the foam base layer 14 is for example comprised between 30 $kg/m^3$ and 70 $kg/m^3$, and in particular about 50 $kg/m^3$.

The thickness of the foam base layer 14 is for example comprised between 5 mm and 30 mm, for example between 10 mm and 15 mm.

The foam base layer 14 advantageously has spring properties. In this case, the foam base layer 14 has an elasticity modulus greater than 10,000 Pa. This modulus is advantageously comprised between 20,000 Pa and 100,000 Pa, in particular between 30,000 Pa and 40,000 Pa.

The intermediate layer 16 is airtight. "Airtight" means that its air flow resistance is too high to be measured using the method described above.

The intermediate layer 16 has a thickness smaller than that of the porous layer 12, advantageously a thickness comprised between 1 mm and 4 mm.

The surface density of the intermediate layer 16 is greater than 50 $g/m^2$, and is in particular greater than 150 $g/m^2$, advantageously greater than 210 $g/m^2$. This surface density is in particular comprised between 250 $g/m^2$ and 1100 $g/m^2$.

The surface density of this intermediate layer 16 is in any case lower than that of a traditional heavy layer, which is about 1500 $g/m^2$.

The intermediate layer 16 is assembled on the porous layer 12.

Contrary to the products mentioned in the preamble for which the intermediate layer 16 is obtained by filling pores or interstitial spaces arranged in the porous layer 12 using a foaming material injected during the production of the foam base layer 14, the intermediate layer 16 according to the invention is actually an interface without or with a very low penetration in the layer 12.

In one alternative, the porous assembly defined above comprises a resistive porous layer (not shown), arranged on the porous layer 12.

The production method according to the invention is implemented in an installation shown in FIG. 2. The installation 22 includes a mold 20 defining a foaming cavity 24, and an assembly 26 for injecting the precursor material intended to form the foam base layer 14 in the foaming cavity 24.

According to the invention, the installation 22 further includes an assembly 27 for producing a counter-pressure by injecting fluid into the foaming cavity 24.

The mold 20 includes a first half-mold 28 supporting the porous layer 12, and a second half-mold 30 closing the cavity 24.

The half-molds 28, 30 are movable relative to one another between an open position for accessing the cavity 24 and a closed position for foaming in the cavity 24.

The first half-mold 28 defines a bearing surface 31 intended to receive the porous layer 12 by bearing.

The first half-mold 28 further defines fluid injection orifices 32, connected to the production assembly by a counter-pressure 27.

The density of orifices 32 is for example comprised between 1 orifice per square meter and 8 orifices per square meter.

A distance taken along the surface 31 comprised between 100 mm and 300 mm, in particular between 150 mm and 250 mm, advantageously separates two adjacent orifices 32.

The transverse span of each orifice 32, in particular their diameter when they have a circular section, is comprised between 3 mm and 10 mm.

The second half-mold 30 defines a closing surface 34 of the mold 20, intended to be placed across from and separately from the bearing surface 31.

The injection assembly 26 is able to bring the precursor material into the cavity 24, on a first side of the porous layer 12.

The assembly for producing a counter-pressure 27 is able to inject fluid, in particular a gas, through each orifice 32, on a second side of the porous layer 12 opposite the first side, to produce a counter-pressure.

The pressure of the injected fluid is for example greater than 0.5 relative bar, and in particular comprised between 1 relative bar and 3 relative bar.

A first production method according to the invention will now be described. Initially, the porous layer 12 is produced, for example by expansion of a precursor material in an auxiliary foaming mold (not shown).

Then, the porous assembly including the porous layer 12 and optionally the resistive porous layer is inserted into the cavity 24 of the mold 20 by placing a first side of the porous layer 12 across from and separately from the closing surface 34 of the second half-mold 32. A free space is available in the cavity 24 on the first side of the porous layer 12.

A second side of the porous layer 12 is placed across from the bearing surface 31. In this example, the porous layer 12 is pressed against the bearing surface 31.

Figure 5:
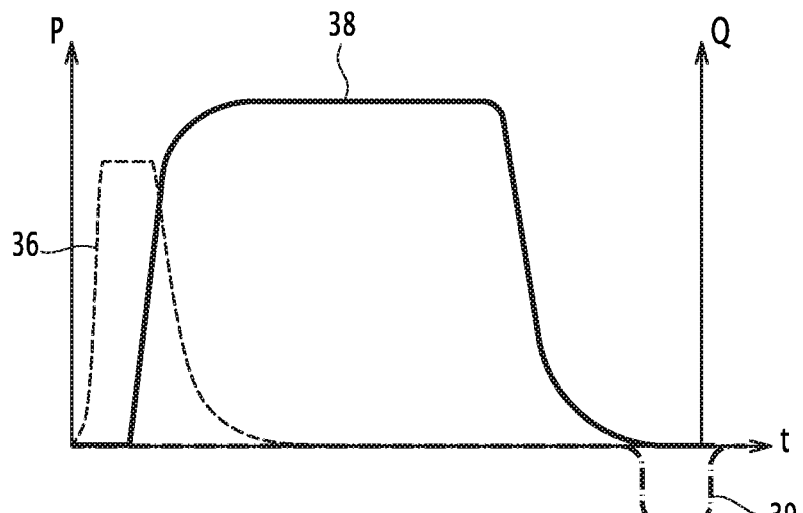
FIG. 5 is a view illustrating a curve of the pressure applied in the foaming mold and the quantity of foaming material introduced as a function of time.

Then, the precursor material is injected into the cavity 24, in the space available on the first side of the porous layer 12, as illustrated by the curve 36 of the flow rate of material added as a function of time in FIG. 5.

The volume of precursor material is initially smaller than the volume of the available space.

Figure 3:
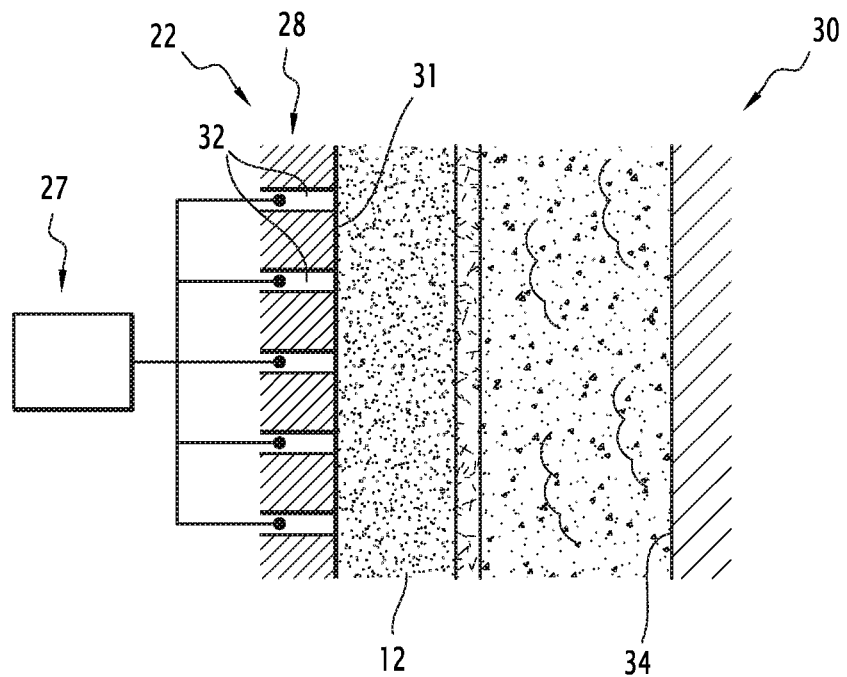

In reference to FIG. 3, the precursor material undergoes an expansion and fills the available space on the first side of the porous layer 12.

The assembly for producing a counter-pressure 27 is then activated. Pressurized gas is injected through the orifices 32 into the porous layer 12, as illustrated by the pressure curve 38 in the porous layer as a function of time in FIG. 5.

This gas injection advantageously starts when the expanding precursor material has completely filled the space 24 of the mold, or between about 10 s and 20 s after the end of the injection.

An internal pressure is then present in the primarily open pores of the porous layer 12, ensuring its mechanical maintenance against the expansion force created by the foam base layer 14 being formed.

The porous layer 12 therefore substantially retains the thickness that it had when it was introduced into the cavity 24 of the mold 20.

The thickness variation of the porous layer 12 is for example less than 30%.

In this example, the counter-pressure through the porous layer 12 greatly limits the penetration of the foam making up the layer 14 being formed, confining the interface between the two foam layers 12, 14. The penetration thickness of the foam making up the layer 14 in the porous layer 12 is advantageously less than 2 mm.

A tight intermediate layer 16 is thus formed. This layer 16 has the appearance of a collapse, but with a limited thickness and therefore density. This is a surprising effect of the invention.

Without feeling bound by any one theory, the Applicant could explain this phenomenon as follows.

Maintaining the counter-pressure in the foam 12 in fact drives a certain air flow over the surface of this same layer 12, since the molds are never completely tight. The air therefore moving in a non-laminar manner on the surface of the layer 12 causes the instability of the foam 14 being formed thereon, i.e., an anarchic formation of the cells that inevitably ends in collapse, but very locally near the foam 12 and therefore over a reduced thickness.

This type of collapse is therefore not comparable to that described in the preamble caused by the sudden collapse of the layer 12, which is generalized and relates to the entire layer 14, but rather to a densification of the foam. Nevertheless, this air flow does not prevent the collapse-type layer 16 from coming into contact with the layer 12 under the effect of the expansion pressure and adhering thereto.

The thickness of the layer 16 is for example less than 50% of the thickness of the foam base layer 14, in particular comprised between 5% and 30% of the thickness of the foam base layer 14.

In a cut of the part 10, the interface layer 16 has a skin on the side of the foam base layer 14, the skin having no pores and advantageously a less compact zone (with a few pores) on the layer 12 side.

Once the foam base layer 14 is stabilized, the assembly for producing a counter-pressure 27 is deactivated, i.e., between 20 s and 60 s after the end of the injection of the precursor material of the layer 12.

Advantageously, just after stopping the counter-pressure, it is possible to produce a partial vacuum (see curve 39 in FIG. 5) in the foam 12 through the same array of holes allowing the counter-pressure, with the aim of perfecting the opening of the cells of the layer 14 and thereby discharging a significant portion of the VOCs that are present.

The mold 20 is then opened and the part 10 is extracted.

The presence of a counter-pressure in the porous layer 12, opposing the expansion force of the layer 14 being formed, avoids the abrupt crushing of the porous layer 12 and guarantees that the foam base layer 14 does not collapse. It avoids the penetration of the foam 14 in the foam 12, thereby allowing the formation and confinement of the interface. This leads to an intermediate layer 16 with a controllable thickness and surface density.

Producing the vacuum makes it possible, by opening the cells, to increase the porosity of the layer 14 and therefore the acoustic efficiency of the complex assembly while greatly limiting the presence of VOCs.

The mechanical and acoustic properties of the part 10 are therefore controlled and guaranteed. The method according to the invention is particularly easy to implement and does not require modifying the part 10. It in particular allows the formation of the foam 30 base layer 14 and its simultaneous assembly on the porous layer 12, without having to perform multiple assembly operations. The cost of producing the part 10 is therefore reduced.

FIG. 8 shows the curves illustrating the noise reduction index as a function of the frequencies for two products according to the invention (H1 and H2) and a product according to WO03/069596 constituting the state of the art called LWC (Light Weight Concept).

H1 and H2 are made up of foams 12 and 14 and an interface 16 made from similar precursor materials for the layer 12 and the layers 14, 16, respectively, leading to foams with acoustic parameters in the ranges defined according to the invention. Thus, the layer 12 has a density of about 90 kg/m$^3$ and a stiffness greater than 0.1 Nm.

The total surface density of H1 is 2.6 kg/m$^2$ with an interface 16 of 600 g/m$^2$. The total surface density of H2 is 2.3 kg/m$^2$ with an interface 16 of 600 g/m$^2$.

The LWC surface density is 2.5 kg/m$^2$ with a heavy mass of 1 kg/m$^2$ and an upper "stiffening" layer with a density of 60 kg/m$^3$.

One can see that H1 has a behavior very close to LWC, particularly from 2500 Hz. This can be explained by the relatively high surface density of the interlace 16, which allows good insulation behavior. The relatively high stiffness of the layer 14 due to the density of 90 kg/m$^3$ allows the earthing phenomenon described in FR 2,979,308, further improving the insulating behavior, such that the tight interlace 16 behaves almost like a heavy mass of 1 kg/m$^2$ reproducing the general behavior of an LWC-type complex.

The performance of H2, with a lighter weight, is slightly lower, but very good, particularly at low and medium frequencies.

In conclusion, for a practically identical weight, a part according to the invention has an acoustic behavior, comparable to a complex of the LWC type with the advantage of being formed by injecting only two layers, the third resulting from the formation of the interface between these layers.

Furthermore, substantially the same precursor material can be used to form the porous layer 12 and the foam base layer 14, by adjusting the proportions of the different components of the precursor material, which simplifies the logistics of the production method.

Furthermore, if the product is formed solely from polyurethane (without the resistive nonwoven), it is very easy to recycle (production of flakes next assembled by gluing).

Figure 6:
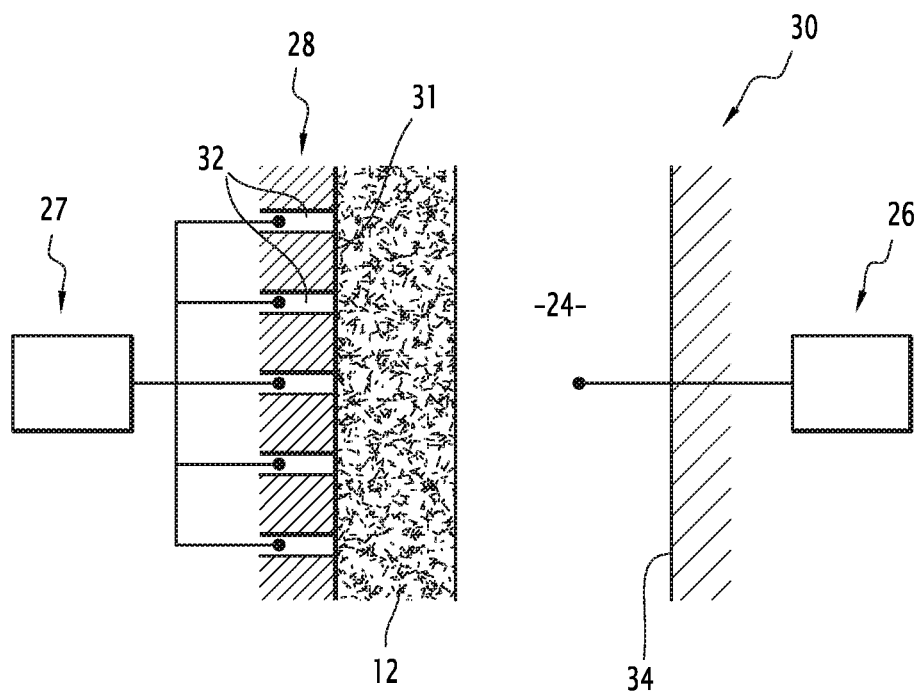
FIG. 6 is a view similar to FIG. 2 of a first step for producing a second automotive equipment part using the method according to the invention.

The production method illustrated by FIG. 6 is intended to form a part 10 including a porous layer 12 made with a base of felt.

Within the meaning of the present invention, "felt" refers to a mixture of base fibers and binder. The fibers can be noble and/or recycled fibers, natural or synthetic, of one or several types. Examples of natural fibers that can be used are linen, cotton, hemp, bamboo, etc. Examples of synthetic fibers that can be used are glass fibers, Kevlar, polyamide, acrylic, polyester, polypropylene.

The binder is for example a resin or binding fibers that have a melting point lower than that of the base fibers to be bonded. Examples of resins are epoxy resins or phenolic resins. Examples of binding fibers are polypropylene, polyethylene, polyamide, polyester, or bicornponent polyesters.

In one alternative, the felt comprises a higher percentage of microfibers, for example more than 50%, and advantageously 80% microfibers.

Microfibers" refer to fibers with a size smaller than 0.9 dtex, advantageously 0.7 dtex.

In one alternative, the felt contains recycled material, for example coming from waste of internal or external origin, in particular scraps from automotive equipment parts, manufacturing rejects, or end-of-life vehicle parts. This waste is for example ground and incorporated into the felt in the form of divided pieces of material made up of agglomerates, flakes or particles. The components of the waste can be separated before or during grinding.

In particular, it is possible to add materials of the elastomer type into the felt, as described in FR 2,889,617. These materials can help increase the stiffness of the layer 14, able to improve the insulating performance of the complex.

A textile refers to a web of fibers essentially with a thermoplastic polymer base such as polypropylene, polyesters or polyamides, assembled mechanically by needlepunching without using chemical binders. Such a web may contain a percentage of thermoplastic or natural recycled fibers.

Figure 4:
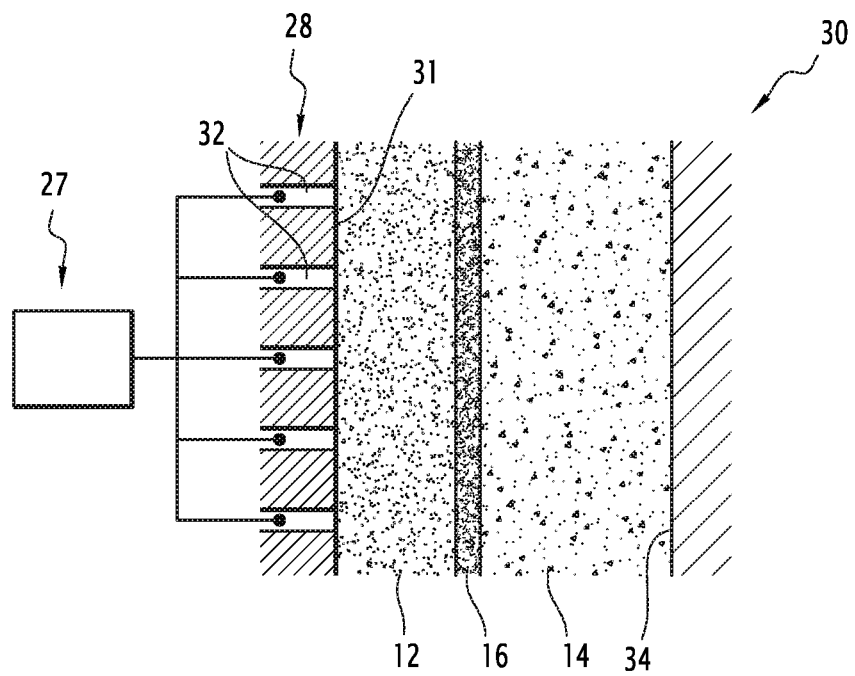

The method of FIG. 6 is implemented similarly to the method illustrated by FIGS. 2 to 4.

Figure 7:
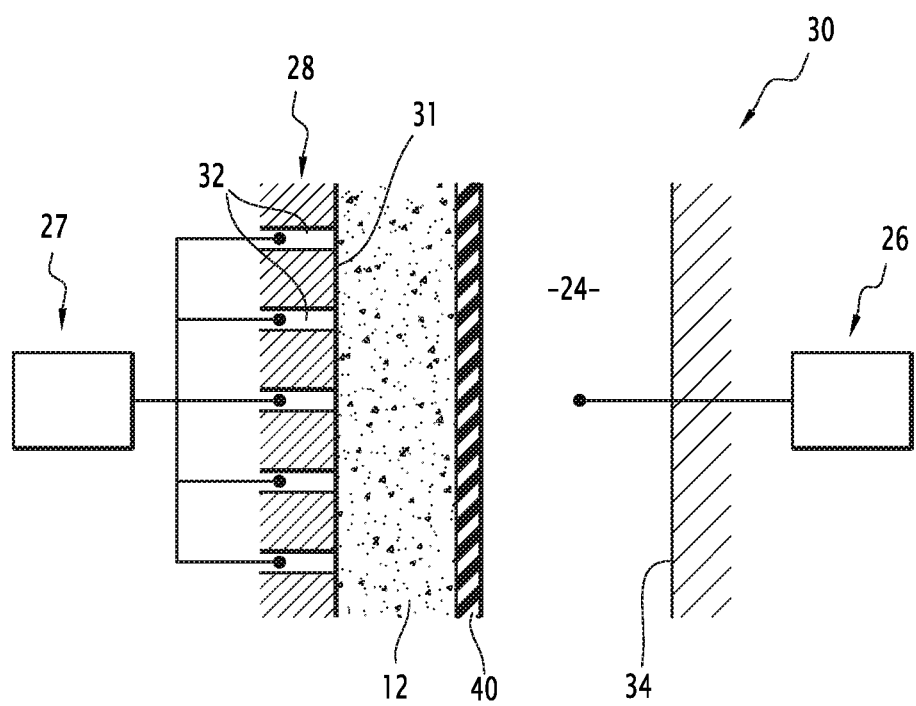
FIG. 7 is a view similar to FIG. 2 of a first step for producing a second automotive equipment part using the method according to the invention.

The production method illustrated by FIG. 7 is intended to form a part 10 including an impermeable layer 40 attached on the first side of the porous layer 12.

The impermeable layer 40 is for example a heavy mass layer advantageously including a thermoplastic material such as polyolefin (Ethylene Vinyl Acetate, Polyethylene, Ethylene Propylene Diene Monomer) and incorporates fillers such as bitumen, chalk and/or barium sulfate.

The Young's modulus of the impermeable layer 40 is less than 1000 MPa, it advantageously has a density greater than or equal to 15,000 kg/m$^3$, preferably greater than or equal to 2000 kg/m$^3$, a surface density comprised between 0.2 kg/m$^2$ and 9 kg/m$^2$, and advantageously a thickness comprised between 0.1 millimeters and 5 millimeters.

The impermeable layer 40 is fixed on the porous layer 12 before introducing the porous layer 12 into the cavity 24.

In this case, the porous layer 12 may optionally have a lower stiffness, as described in WO03/069596. This lower stiffness is for example reflected in a value below 0.01 N.m and corresponds to foam densities of about 30 kg/m$^3$ to 50 kg/m$^3$.

In the case of a low stiffness of the layer 12, it is less a collapse that is to be feared than it is the crushing of the foam 12 under the effect of the compression resulting from the expansion of the foam 14. Indeed, this gradual crushing does not cause collapse, but the higher foaming volume of the layer 14 causes a density lower than that desired in a method according to the state of the art. Furthermore, the part, due to the resilience of the spring layer 14, will have a thickness leaving the mold greater than that which is desired, which will create problems during assembly on the vehicle.

The method according to the invention resolves these problems.

The production method illustrated in FIG. 7 is also implemented similarly to the method illustrated by FIGS. 2 to 4.

In one alternative of this method, at least one additional porous layer is attached on the porous layer 12, on the second side of the porous layer 12, opposite the impermeable layer 40, as for example described in WO03069596.

The method according to the invention is therefore able to be implemented to produce parts 10 with quite varied structures.

The invention claimed is:

1. A method for manufacturing an automotive equipment part, comprising:
   arranging a porous layer in a foaming mold;
   injection, on one side of the porous layer, of a foam precursor material;
   expansion of the foam precursor material to form a foam base layer bonded to the porous layer;
   injecting a pressurized fluid on a second side of the porous layer to form a counter-pressure to the expansion of the foam precursor material;
   extraction from the foaming mold of an equipment part including the porous layer and the foam base layer bonded to the porous layer,
   wherein the foaming mold comprises a mold surface, and arranging the porous layer in the foaming mold includes arranging the second side of the porous layer across from the mold surface,
   wherein the pressurized fluid is injected through a plurality of orifices emerging in the mold surface, and
   wherein the foam precursor material forms a tight intermediate layer at an interface between the porous layer and the foam base layer without penetrating the porous layer, the method further comprising maintaining the counter-pressure on the second side of the porous layer so as to provide a non-laminar fluid flow over a surface of the porous layer to cause instability of the foam base layer being formed thereon.

2. The method according to claim 1, wherein the pressurized fluid is a gas.

3. The method according to claim 1, wherein the pressurized fluid is injected after the foam precursor material is injected.

4. The method according to claim 3, wherein the pressurized fluid is injected after the foam precursor material comes into contact with the porous layer during the expansion of the foam precursor material.

5. The method according to claim 1, wherein a density of orifices emerging in the mold surface is comprised between 1 orifice per square meter and 8 orifices per square meter.

6. The method according to claim 1, comprising applying a vacuum on the second side of the porous layer after the foam base layer is formed.

7. The method according to claim 1, wherein the porous layer is chosen from among an expanded foam layer, a felt layer, or a slit foam layer.

8. The method according to claim 7, wherein the porous layer is a layer of expanded foam, the method including, before arranging the porous layer in the foaming mold, forming the porous layer from a foam precursor material including same components as the foam precursor material of the foam base layer.

9. The method according to claim 8, wherein the foam base layer and the porous layer are made with a base of a precursor mixture of a same polyol, a same isocyanate, and water.

10. The method according to claim 8, wherein the foam base layer and the porous layer are made with a base of a precursor mixture of a same polyol, and a same isocyanate, the expanded foam layer including fillers.

11. The method according to claim 1, wherein the porous layer bears at least one tight layer, the at least one tight layer being situated on a first side of the porous layer after the porous layer is arranged in the foaming mold.

12. The method according to claim 10, wherein the fillers are chosen from among chalk, barite, or mixtures thereof.

* * * * *